United States Patent [19]
Kita

[11] Patent Number: 5,291,592
[45] Date of Patent: Mar. 1, 1994

[54] SYSTEM HAVING DOCUMENT SCANNER FOR OPTICALLY SCANNING INFORMATION WHEREBY A FIRST INFORMATION CONTAINS CONTROL INFORMATION INDICATING A NUMBER OF SHEETS TO BE SCANNED

[75] Inventor: Sumio Kita, Nara, Japan

[73] Assignee: Sharp Kabushiki Kaisha, Osaka, Japan

[21] Appl. No.: 520,197

[22] Filed: May 9, 1990

[30] Foreign Application Priority Data

| May 15, 1989 | [JP] | Japan | 1-121802 |
| May 15, 1989 | [JP] | Japan | 1-121803 |
| May 15, 1989 | [JP] | Japan | 1-121804 |

[51] Int. Cl.$^5$ .............................................. G06F 3/00
[52] U.S. Cl. ................................. 395/600; 395/650; 364/237.82; 364/237.83; 364/237.9; 364/DIG. 1
[58] Field of Search .................. 395/600, 200, 650; 364/900

[56] References Cited

U.S. PATENT DOCUMENTS

| 4,571,699 | 2/1986 | Herzog et al. | 364/900 |
| 4,670,791 | 6/1987 | Murata et al. | 358/256 |
| 4,750,212 | 6/1988 | Yokomizo | 382/56 |
| 4,941,125 | 7/1990 | Boyne | 395/600 |
| 4,985,863 | 1/1991 | Fujisawa et al. | 395/600 |

Primary Examiner—Thomas C. Lee
Assistant Examiner—Paul Harrity
Attorney, Agent, or Firm—Nixon & Vanderhye

[57] ABSTRACT

An electronic filing apparatus files documents employing an optically readable mark sheet. A scanner reads a set of data sheets including the mark sheet and original sheets. The mark sheet sets reading conditions for scanning the original sheets in the scanner according to marks on the mark sheet. Original image data on the original sheets is read based on the set reading conditions and filed in a storage device. For filing small amounts of information, both control mark and original image information may be included on a single sheet. The mark sheet may include marks representing search terms descriptive of the content of the original image data which can be used by an operator to search the electronically registered and filed documents.

9 Claims, 10 Drawing Sheets

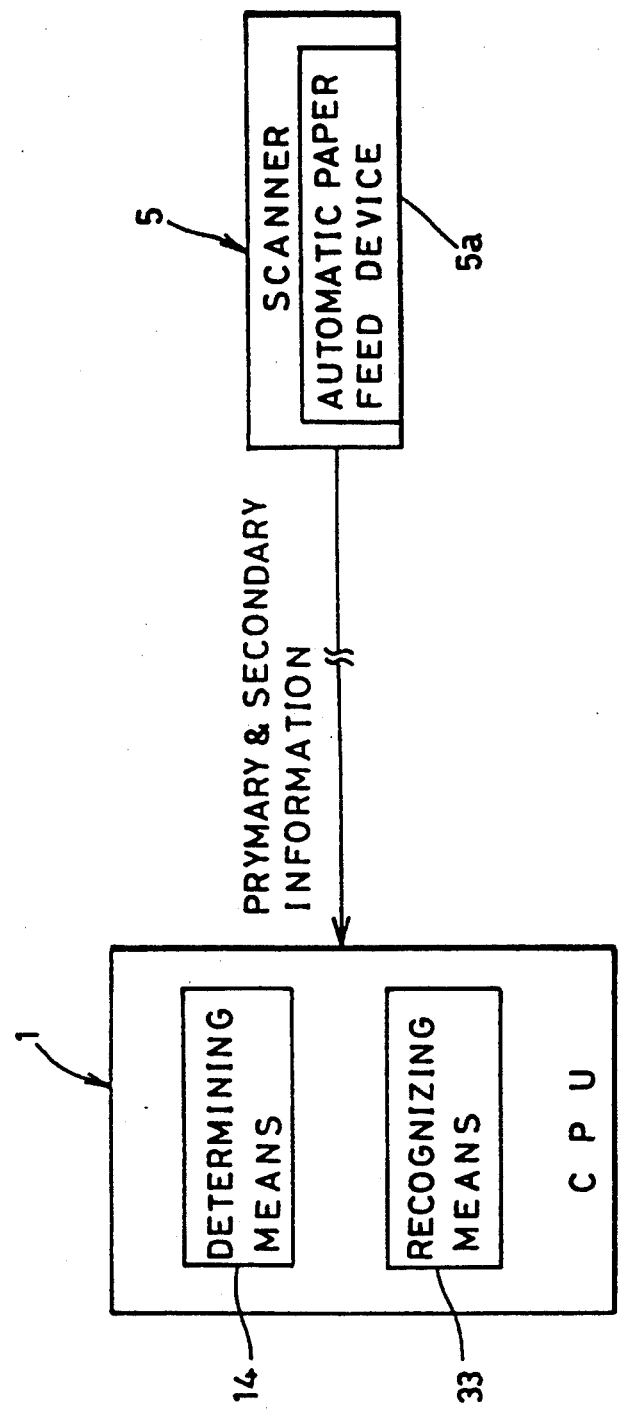

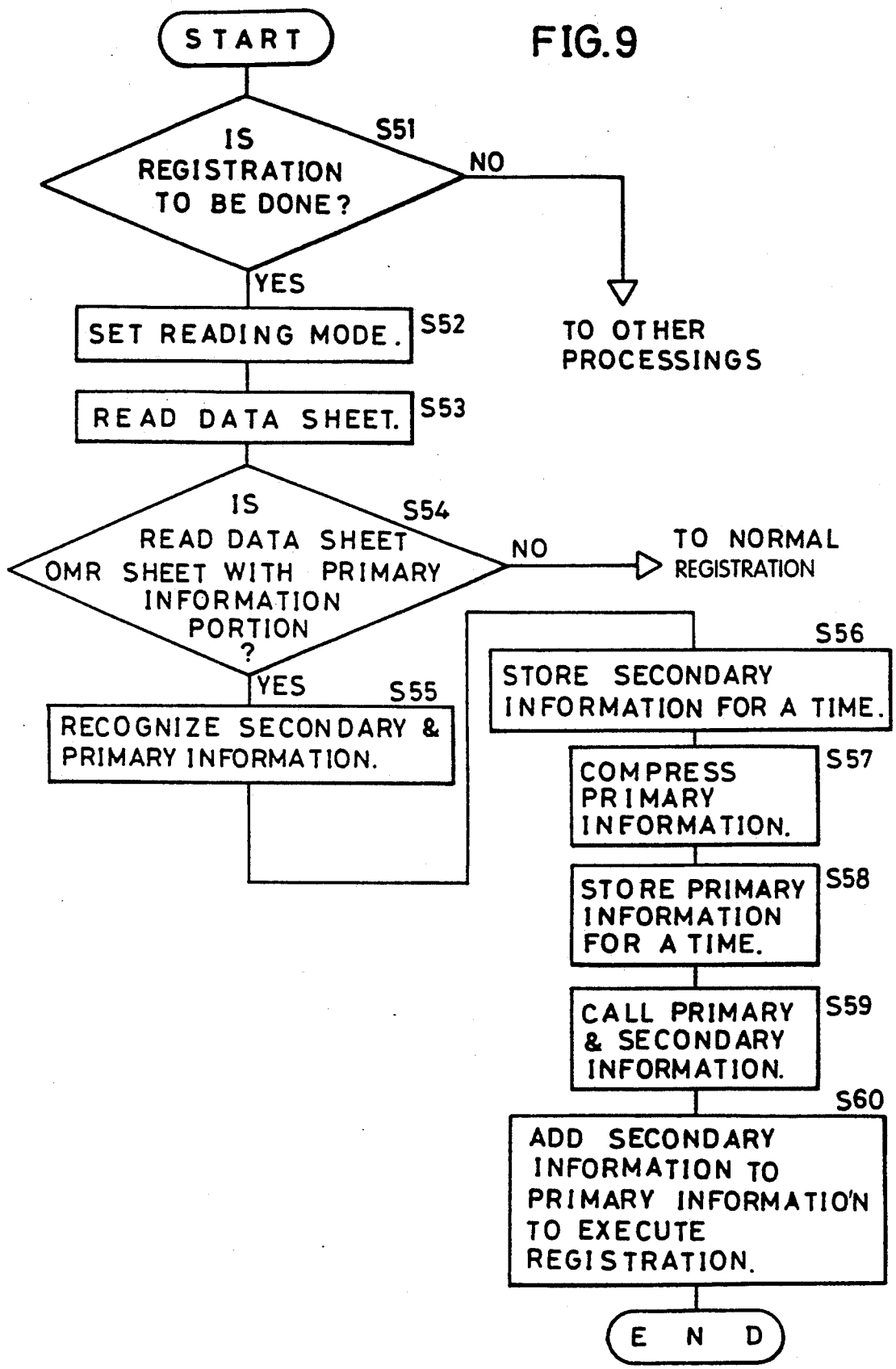

SYSTEM HAVING DOCUMENT SCANNER FOR OPTICALLY SCANNING INFORMATION WHEREBY A FIRST INFORMATION CONTAINS CONTROL INFORMATION INDICATING A NUMBER OF SHEETS TO BE SCANNED

BACKGROUND OF THE INVENTION

The present invention relates generally to electronic filing apparatuses, and more particularly to an electronic filing apparatus for filing documents employing an optically readable mark sheet.

Electronic filing apparatus have recently been considered; for filing documents produced daily in offices. Such an electronic filing apparatus comprises a scanner by which information of documents is optically read to be stored in a storage medium such as an optical disc. An electronic filing apparatus searches through registered information so as to retrieve required information from the registered information and then output the same to a printer at any time by predetermined output means.

The above described electronic filing apparatus including a scanner with an automatic paper feeding device is proposed. In this structure, the automatic paper feeding device feeds sequential data sheets to the scanner without moving the scanner to scan the data sheet. In this way, information is automatically read from the scanned data sheet.

In reading a data sheet, reading conditions are set in the electronic filing apparatus which reflect (1) the size of an original sheet or a data sheet, whether (2) the surface of the original is one side or both sides of paper, (3) the density of an image, (4) whether the image includes characters, photographs or the mixture of characters and photographs, etc. In reading different types of data sheets, reading conditions clearly vary for each data sheet and hence must be set many times. In the above described electronic filing apparatus, reading conditions are set by operation of a keyboard by an operator. Thus, the operator must continually operate of the keyboard while reading in the data sheets. Because the data sheet reading by the scanner is interrupted during the setting of reading conditions, the time required for filing is increased.

In addition, since the number of originals read typically is not monitored, plural sheets of originals are often erroneously fed at a time by the automatic paper feeding device. If plural sheets other than the first page are not read, the information on these sheets cannot later be detected by search;

Data used to search for data sheets must be registered for a set of data sheets along with data read from the data sheets. Filling data sheets also requires that data for searching for data sheet be set. Both of these processes are time consuming and prone to error.

SUMMARY OF THE INVENTION

It is an object of the present invention to provide an electronic filing apparatus in which reading conditions can be set easily.

It is another object of the present invention to provide an electronic filing apparatus capable of informing an operator that information from an original has not been recorded because of a reading error.

It is a further object of the present invention to provide an electronic filing apparatus in which search conditions be set easily.

It is a still further object of the present invention to provide an electronic filing apparatus for facilitating registration of data sheets especially where the amount of information contained on a data sheets is small.

An electronic filing apparatus in accordance with the present invention reads information from an original sheet and a mark sheet and processing conditions of the original sheet based on processing conditions represented by marks on the mark sheet. According to another aspect of the present invention, the processing conditions include the actual reading condition of the reading means. The original sheet is read based on the set.

A reading mode of reading means is automatically set corresponding to reading mode information provided on the mark sheet according to the type of data sheets. This automatic setting of the reading mode eliminates the necessity of resetting the reading mode upon registration of information of different type data sheets. Attaching a mark sheet to a set of data sheets enables automatic processing to continue until registration is completed.

The mark sheet eliminates the need for an operator to set a reading mode and enhances the efficiency of registration by reducing the time required for setting the reading mode.

According to still another aspect of the present invention, the number of sheets fed from paper feeding means to reading means is a counted by counting means. A determination is then made whether or not the number of sheets counted equals the number of sheets read from the mark sheet. If they are not equal, an alarm is generated. If the number of original sheets actually read is different from the number to be read, this difference is reported to the operator. This avoids registering "dropped" information and accurately registers information.

According to still another aspect of the present invention, a mark sheet is employed which includes in part original data. The original data on the mark sheet and marks including information such as a search condition are individually recognized.

When on sheets to be registered is small, on the mark sheet including some original data makes it possible to read and recognize search conditions or information and information to be registered to enhance the efficiency of registration and reduces office work.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing the configuration of a CPU applied to the third embodiment of the present invention; and FIG. 9 is a flow chart for describing the operation of the third embodiment of the present invention.

DESCRIPTION OF THE PREFERRED EMBODIMENTS

The first embodiment

Figure 1:
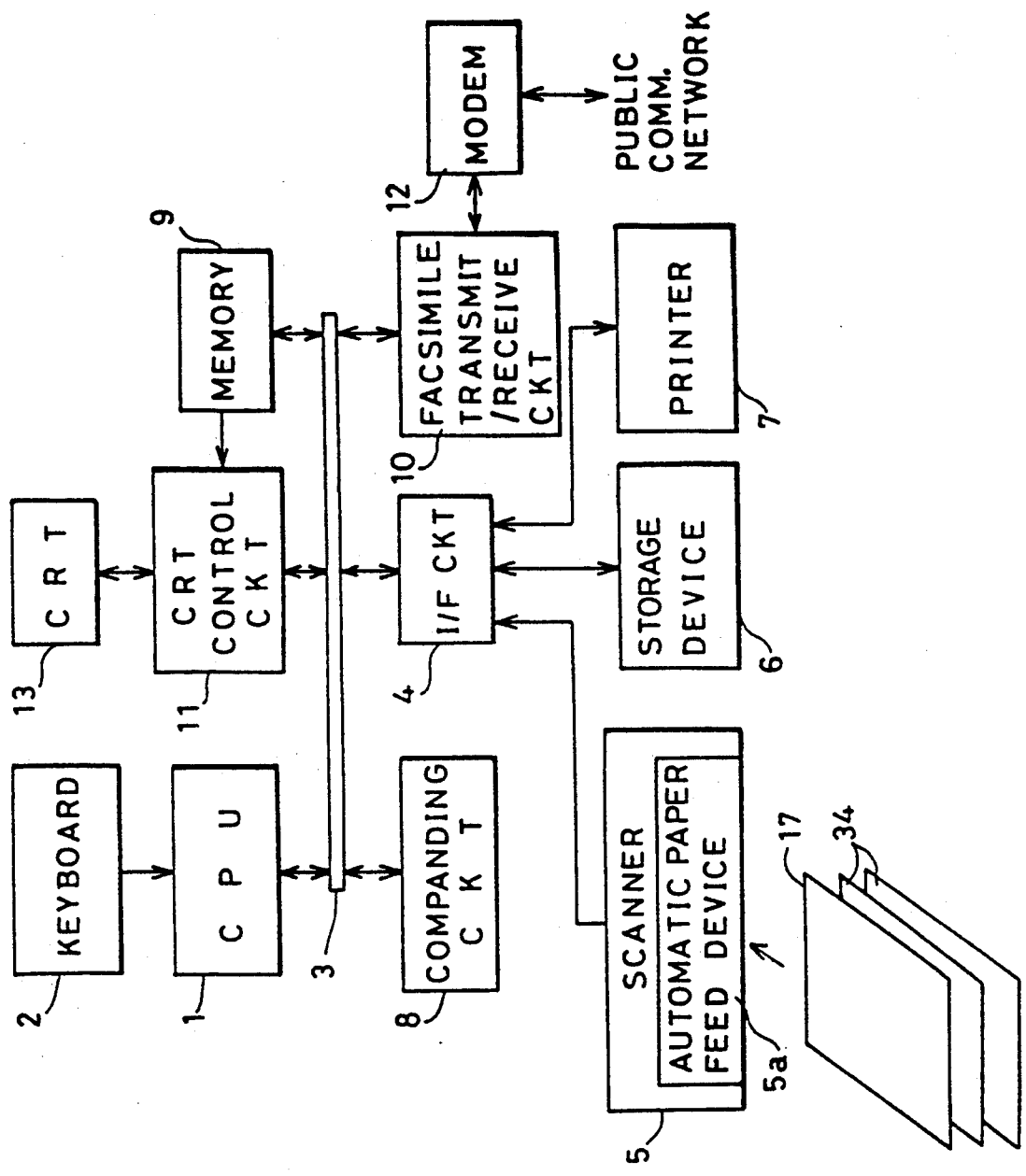
FIG. 1 is a schematic block diagram showing an electrical configuration of an electronic filing apparatus applied to first, second and third embodiments of the present invention.

Referring to FIG. 1, a CPU 2 controls the electronic filing apparatus. The CPU 1 is connected to a keyboard 2, is via a host bus 3 and an interface circuit (I/F circuit in the figure) 4 to a scanner 5, a storage device 6 and a printer 7. The CPU 1 is further connected via host bus 3 to a companding circuit 8, a memory 9, a facsimile transmitting/receiving circuit 10 and a CRT control circuit 11.

The scanner 5 as a document reading means includes an automatic paper feeding device 5a capable of both one-side paper feeding and two-side paper feeding. As automatic paper feeding device 5a feeds data sheets sets, scanner 5 optically reads image information of each data sheet (hereinafter referred to as primary information) and information for carrying out registration, search and other processing information (hereinafter referred to as secondary information). Data sheets include a mark sheet 17 and one or more original sheets 34. The scanner 5 is set to operate in a reading mode for selecting the density of an image, whether or not the image includes characters or photographs, or the mixture thereof, the size of an original, whether or not the surface of the original is one-side or two-sides of paper, etc. in correspondence with instructions from CPU 1. The scanner 5 performs paper feeding and reading corresponding to this reading mode.

The storage device 6 is a recording/reproducing device such as an optical disc device which records primary information and secondary information on a record medium and reproduces the recorded information when necessary.

The companding circuit 8 encodes primary information read by scanner 5 to compress the encoded primary information, and also decodes the compressed primary information to expand and restore the decoded primary information.

The memory 9 temporarily stores primary information, secondary information and other data to transmit the stored information and data to a predetermined device in correspondence with instructions from CPU 1 to perform data process such as registration and search.

The facsimile transmitting/receiving circuit 10 for transmitting/receiving an image to/from a facsimile device of other party is connected via a public communication network through modem 12 to the other party's facsimile device.

The CRT control circuit 11 is connected to CRT 13 for controlling display of CRT 13. The CRT 13 displays primary information and secondary information corresponding to display instructions of CPU 1.

Figure 2:
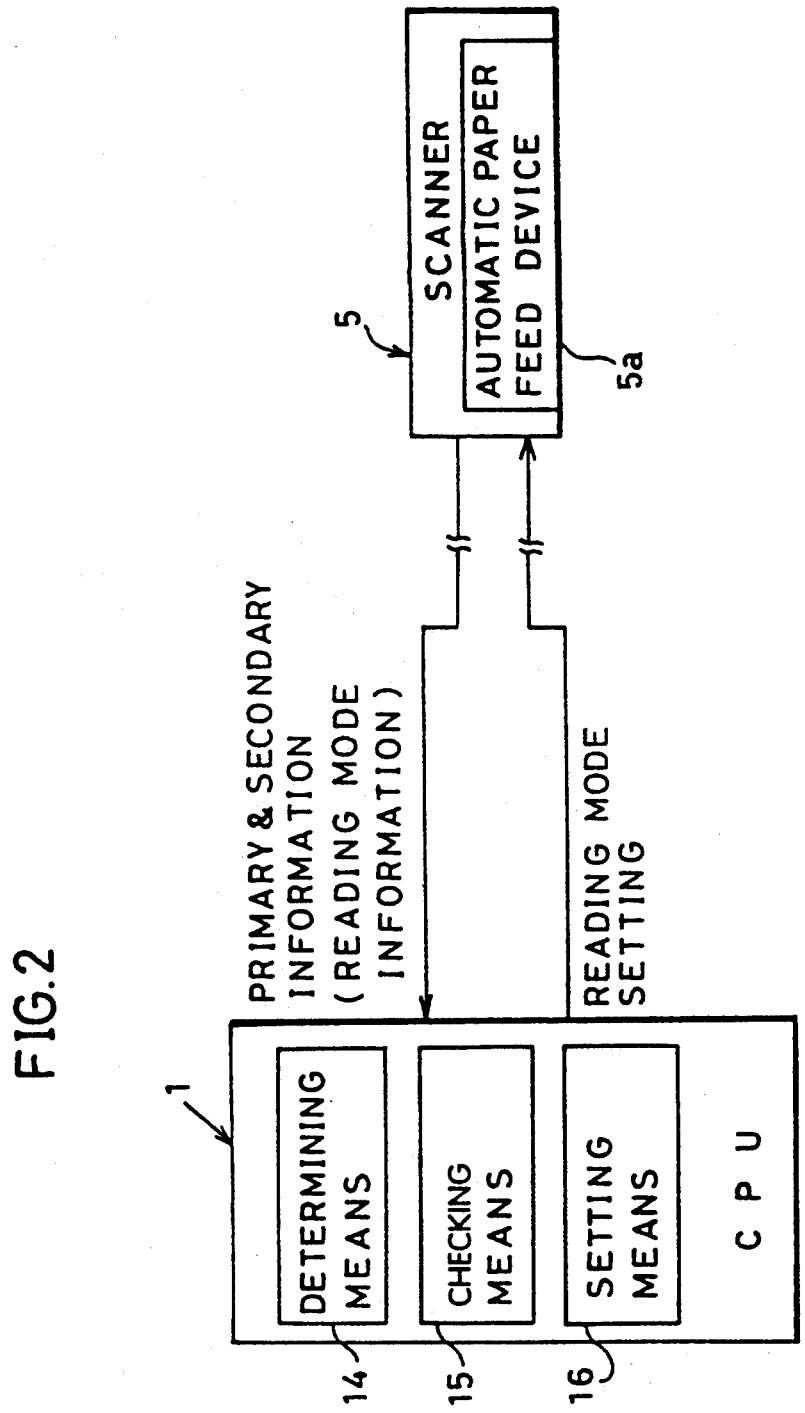
FIG. 2 is a diagram showing the configuration of a CPU applied to the first embodiment of the present invention.

Referring to FIG. 2, CPU 1 comprises determining means 14, checking means 15 and setting means 16.

The determining means 14 determines whether the data sheet read by scanner 5 is an OMR (Optical Mark Reader) sheet 17, which will be described later, in accordance with the presence/absence of timing marks 18.

The checking means 15 checks the presence/absence of each information, which will be described later, out of secondary information of OMR sheet 17 read. The setting means 16 transmits reading mode setting information to scanner 5 in accordance with the information of the above described reading mode so as to set the reading mode.

Figure 3:
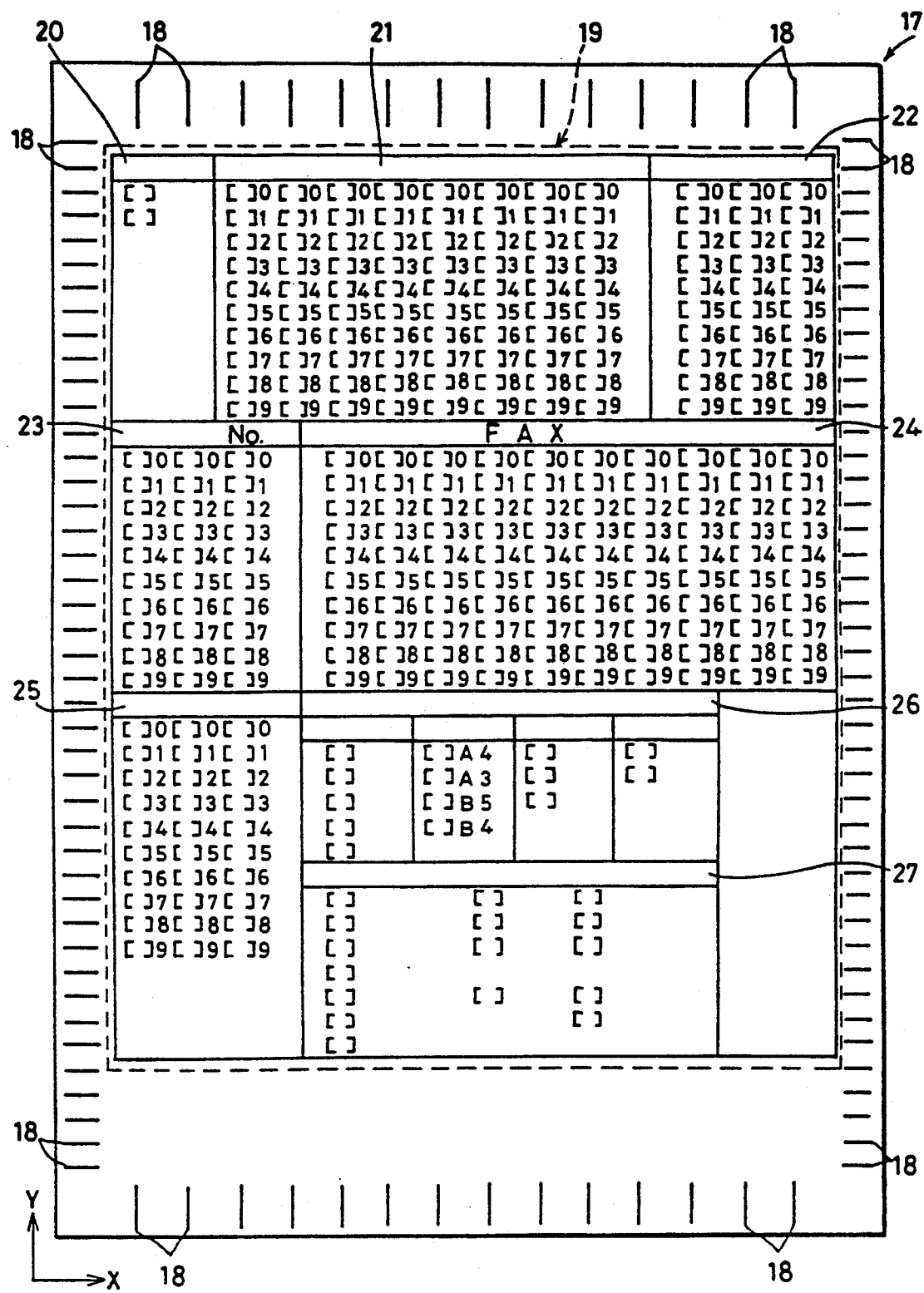
FIG. 3 is a diagram showing an OMR sheet applied to the first and second embodiments of the present invention.

Referring to FIG. 3, OMR sheet 17 employed in this embodiment has timing marks 18 indicating a reading area at the periphery thereof. An area 19 for setting various information to be secondary information is provided inward from the periphery having timing marks 18.

The timing marks 18 are provided in a row direction (X direction) and in a column direction (Y direction) with a predetermined space from one another corresponding to the location of marks written in area 19.

The upper part of area 19 includes a processing type selecting field 20 for selecting the type of processings (registration or search), a registration date field 21 for indicating a registration date, and a number-of-storage month field 22 for designating the number of months for storing primary information.

The middle part of area 19 includes a data number field 23 for indicating the registration number of data sheets to be registered, and a facsimile number field 24 for indicating a facsimile (telephone) number for transmitting/receiving data sheets by facsimile.

The lower part of area 19 includes a number-of-original sheet field 25 for designating the number of original sheets out of data sheets to be registered, a scanner mode field 26 for setting a reading mode (scanner mode) by scanner 5, and a key word field 27 for designating input/output devices of different types and indicating other information.

The scanner mode field 26 includes sub-fields for items required to be set for registration and search, for example, the degree of image density, the size of original, whether the image includes characters or photographs, or the mixture thereof, whether the surface of original is one-side or two-sides of paper, etc. These sub-fields further include places where marks are written in accordance with set items. The marks written in these places corresponding to the type of data sheets sets reading mode information for OMR sheet 17.

The other fields 20–25 and 27 than scanner mode field 26 also include sub-fields for items required to be set for registration and search in the same manner as above, places of which marks are written in corresponding to the type of data sheets. The processings such as registration and search of data sheets are carried out in accordance with information obtained from the location of marks written as above on OMR sheet 17. The location of those marks can be recognized by detecting the location of timing marks 18 arranged in the row direction (X direction) and in the column direction (Y direction) employing known art.

Figure 4:
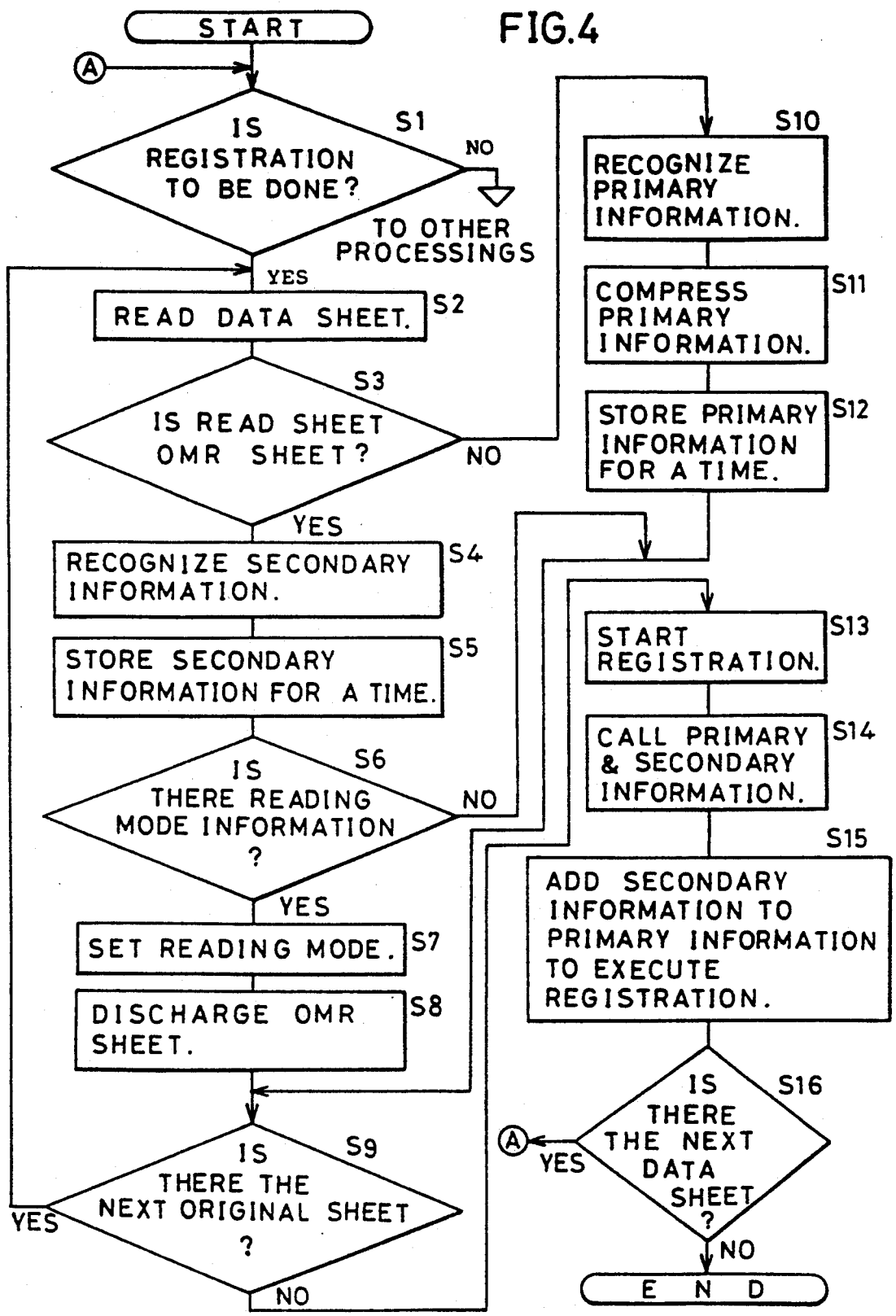
FIG. 4 is a flow chart for describing the operation of the first embodiment of the present invention.

The following is a description of a registration procedure in the electronic filing apparatus with reference to the flow chart of FIG. 4.

Prior to registration, marks are written in advance in each field 20-27 in area 19 on OMR sheet 17 in accordance with secondary information of data sheets.

First, an instruction including registration processing is provided through a keying operation of keyboard 2 (step S1). For data processings other than the registration in step S1, a transfer is made to each of the processings. Meanwhile, in the case of registration processing, when data sheets are set in scanner 5 with OMR sheet 17 placed on top of original sheets 34, these data sheets are accepted beginning with OMR sheet 17 by automatic paper feeding device 5a and are then read by scanner 5 (step S2).

Timing marks 18 on OMR sheet 17 are read by scanner 5, and determining means 14 of CPU 1 determines that the data sheet is an OMR sheet 17 (step S3). Next, secondary information represented by marks in area 19 on OMR sheet 17 is recognized (step S4) and temporarily stored in memory 9 (step S5). Checking means 15 checks the presence/absence of marks in scanner mode field 26 on OMR sheet 17, so that a determination is made whether reading mode information is written or not (step S6).

The reading mode of scanner 5 is set by setting means 16 corresponding to the reading mode information (step S7). Thereafter, OMR sheet 17 from which secondary information is read is discharged by automatic paper feeding device 5a of scanner 5 (step S8), and a determination is made whether or not there is any subsequent original sheet (step S9). If the reading mode information is absent in step S6, the processing transfers to step S9.

Since the second page of data sheets, i.e., original sheet 34 set after OMR sheet 17, a determination is made to confirm that there is a subsequent original sheet in step S9, so that the processing transfers to step S2. Original sheet 34 is accepted in scanner 5 in the same manner as OMR sheet 17 and then read according to the set reading mode. Since timing marks 18 are not provided on the original sheet 34 differently from OMR sheet 17, determining means 14 determines that the original sheet 34 is not OMR sheet 17 in step S3 and the primary information of the original sheet read by scanner 5 is recognized (step S10). This primary information is compressed by companding circuit 8 (step S11) and then temporarily stored in memory 9 (step S12).

When a set of data sheets, based on the secondary information of OMR sheet 17, comprises a plurality of original sheets, a determination is made that there are subsequent original sheets in step S9, and the processing transfers to step S2. The processing is repeated in the procedure of steps S2, S3, S10-S12 for subsequent original sheets.

When processing is completed for all data sheets in the set, and a determination is made that there are no subsequent original sheets in step S9, and CPU 1 provides an instruction to start registration (step S13). Thereafter, the primary and secondary information stored in memory 9 is called by CPU 1 (step S14). Then, CPU 1 adds the primary information to the secondary information to store the added information in recording device 6, so that the data sheets in one set are registered (step S15). When the registration is completed, a determination is made whether there is a further set of data sheets to be registered (step S16).

In set where there is only one case of data sheets to be registered, a determination is made that the next data sheets are absent in step S16, so that the registration processing is completed. If plural sets of data sheets are to be registered, a determination is made that there are more data sheets, processing transfers to step S1. Based on secondary information written on OMR sheet 17 of the next data sheets, processing from step S1 is serially executed, so that subsequent data sheets are registered.

As described above, since the reading mode of scanner 5 can be automatically set by reading the marks provided in scanner mode field 26 on OMR sheet 17, there is no need to reset a reading mode even for different types of data sheets.

The second embodiment

Figure 5:
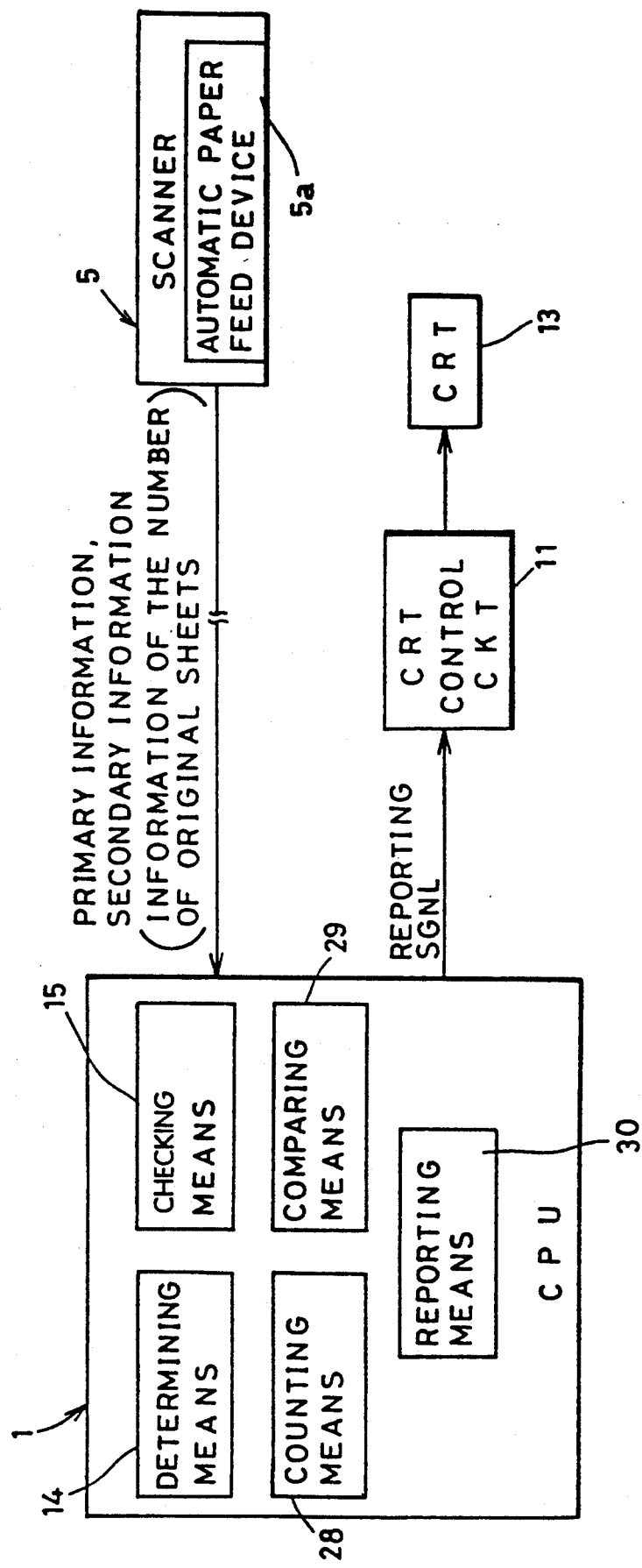
FIG. 5 is a diagram showing the configuration of a CPU applied to the second embodiment of the present invention.

In the second embodiment, as shown in FIG. 5, CPU 1 comprises determining means 14 and checking means 15 similar to the first embodiment and also comprises counting means 28, comparing means 29, and reporting means 30. Although setting means 16 shown in the first embodiment is not shown in FIG. 5, CPU 1 comprises setting means 16 similar to the first embodiment.

Since the electrical configuration of an electronic filing apparatus and an OMR sheet employed in the electronic filing apparatus in this embodiment are the same as those shown in FIGS. 1 and 3 in the first embodiment, a description thereof will not be repeated.

Referring to FIG. 5, checking means 15 checks for information on the number of original sheets in number-of-original sheet field 25 on OMR sheet 17.

Counting means 28 includes a counter for counting the number of original sheets 34 read at the time reading is completed.

Comparing means 29 compares the number of original sheets, checked by checking means 15 and obtained from the number-of-original information of OMR sheet 17, with the number of original sheets counted by counting means 28.

Reporting means 30, when the counted number of original sheets is not identical to the number of original sheets obtained from the number-of-original information according to comparing means 29, outputs a reporting signal to display the contents thereof on CRT 13.

Figure 6A:
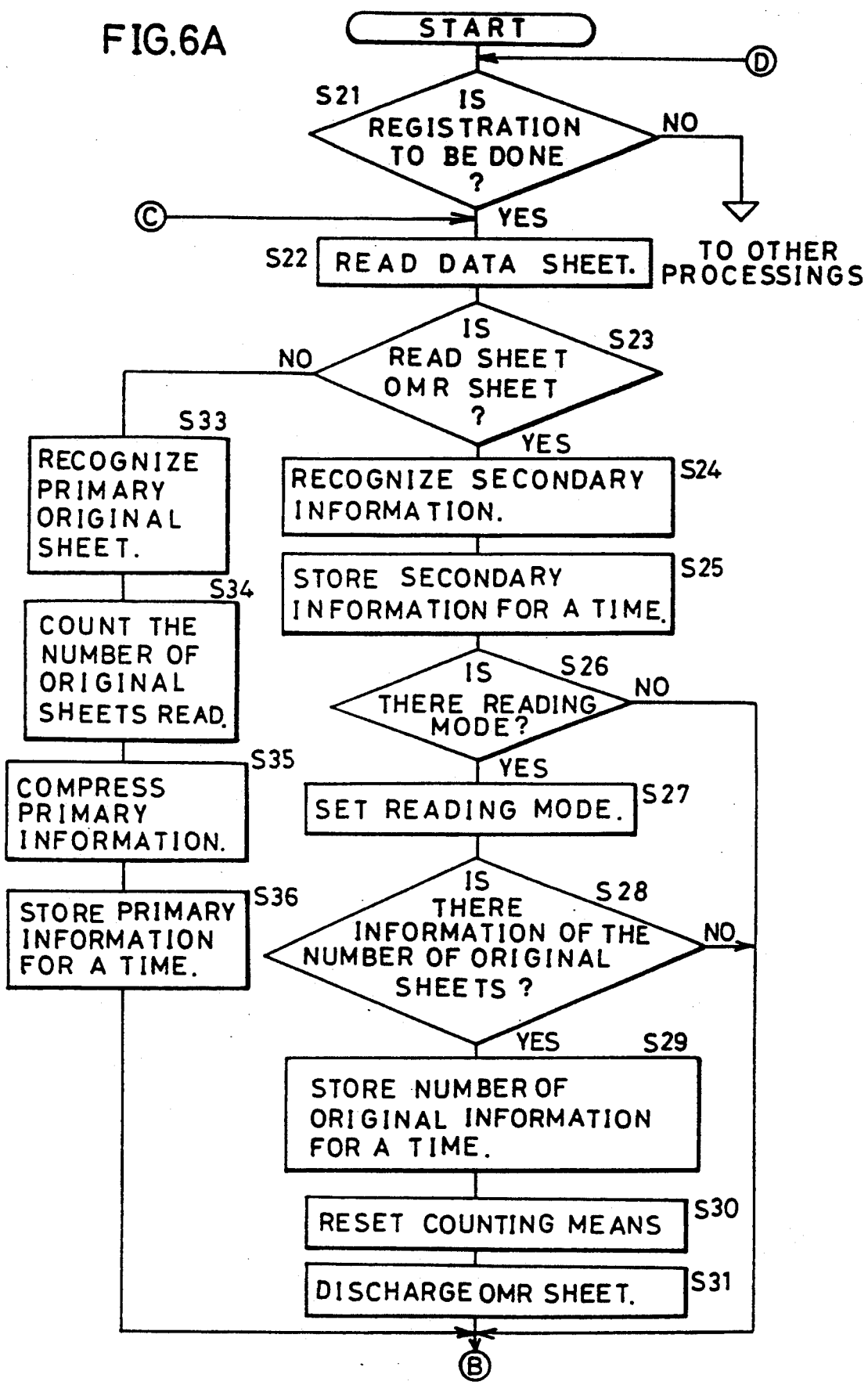
FIGS. 6A and 6B are flow charts for describing the operation of the second embodiment of the present invention.
Figure 6B:
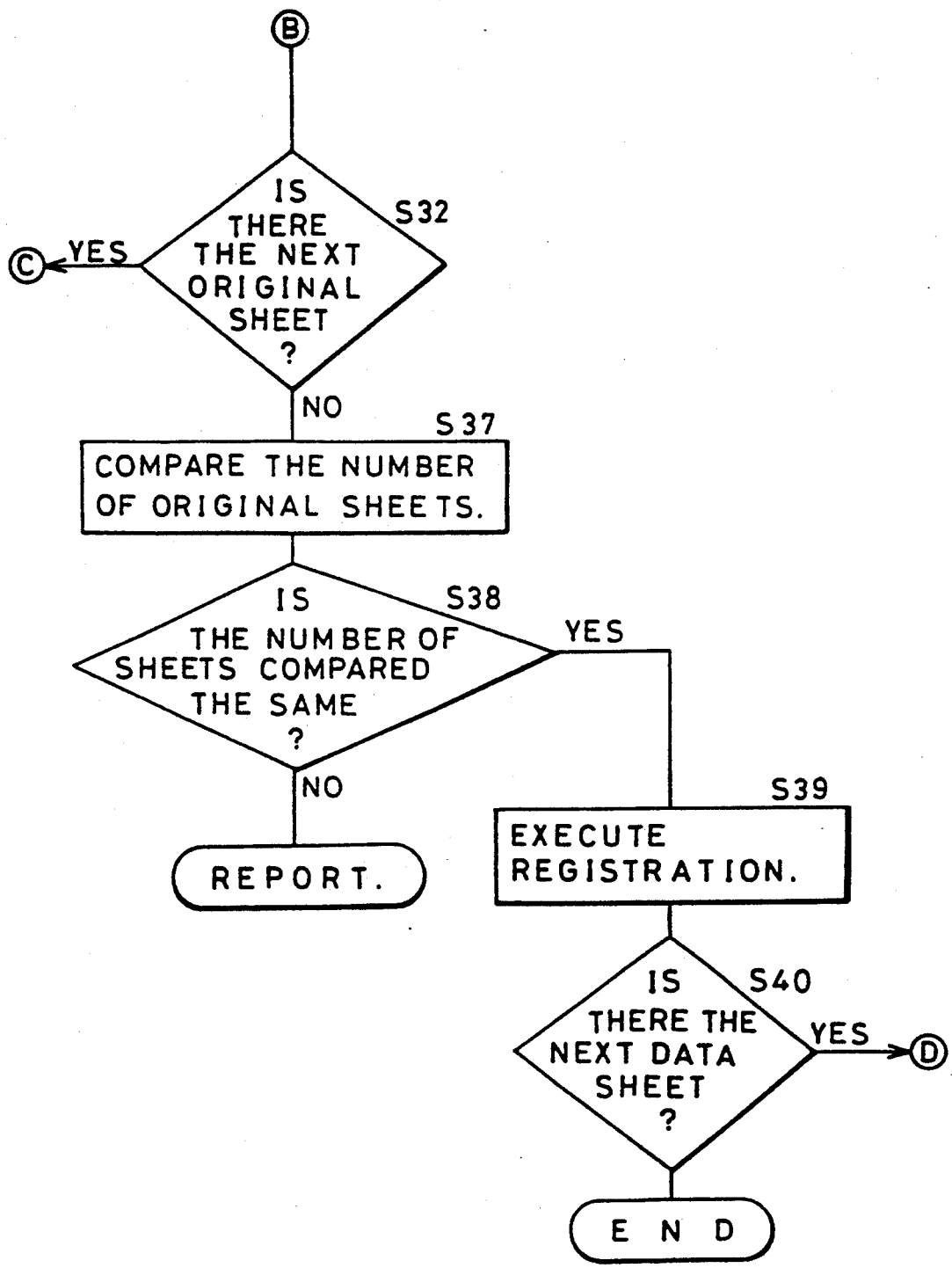

A description will now be given on a procedure of comparison between the number of original sheets read and the number of those to be read with reference to the flow charts of FIGS. 6A and 6B.

Prior to a registration processing, marks are written in advance in each of fields 20-27 in area 19 on OMR sheet 17 based on secondary information of data sheets.

First, an instruction for registration processing is provided through a key operation of keyboard 2 (step S21). In step S21, in case of performing processings other than the registration processing, the subject processing transfers to the other processings. Meanwhile, in the case of registration processing, when data sheets is set with OMR sheet 17 on top in scanner 5, these data sheets are accepted beginning with OMR sheet 17 by automatic paper feeding device 5a and are then read by scanner 5 (step S22).

When timing marks 18 on OMR sheet 17 are read by scanner 5, determining means 14 of CPU 1 determines that the data sheet is OMR sheet 17 (step S23). Next, secondary information represented by marks in area 19 on OMR sheet 17 is recognized (step S24), and temporarily stored in memory 9 (step S25). Thereafter, checking means 15 of CPU 1 checks the presence/absence of marks in scanner mode field 26 on OMR sheet 17, so that the presence/absence of reading mode information is determined (step S26). When a determination is made that there is reading mode information in step S26, the reading mode of scanner 5 is set corresponding to that reading mode information (step S27).

Further in CPU 1, checking means 15 checks the presence/absence of marks in number-of-original sheet field 25 on OMR sheet 17, so as to determine the presence/absence of information of the number of original sheets (step S28). If the number of original sheets to be read is written as marks in number-of-original sheet field 25, the number-of-original sheets information is determined in step S28. When this number of original information is temporarily stored in memory 9 (step S29), counting means 28 is reset (step S30). Thereafter, OMR sheet 17 is discharged by automatic paper feeding device 5a of scanner 5 (step S31), and a determination is made whether or not there are any subsequent original sheets (step S32). If it is determined that there is no reading mode information in step S26, processing transfers to step S32. Meanwhile, if it is determined that there is no number-of-original information in step S28, the processing similarly transfers to step S32.

Since original sheet 34, which is the second page of data sheets, follows OMR sheet 17, a determination is made that there is a subsequent original sheet in step S32, and processing transfers to step S22. In step S22, this original sheet is accepted by scanner 5 and then read in the reading mode previously set as above.

Since there are no timing marks 18 attached on the above original sheet 34 different from OMR sheet 17, determining means 14 determines that the original sheet 34 is not an OMR sheet 17 in step S23. After primary information of the original sheet read by scanner 5 is recognized (step S33), counting means 28 counts the original sheet as the one actually read (step S34). The primary information is compressed by companding circuit 8 (step S35) to be stored temporarily in memory 9 (step S36).

If based on secondary information of OMR sheet 17 the set includes plural original sheets, a determination is made that there are subsequent original sheets in step S32, so that the processing transfers to step S22 again. Processing subsequent original sheets from the second page, the is repeated in the procedure of steps S22, S23, S33-S36 for subsequent original sheets. When this processing is completed with respect to all data sheets in the set, a determination is made that there is no subsequent original sheet in step S32 and the number-of-originals information temporarily stored in memory 9 is called in step S29. Comparing means 29 then compares the number of original sheets based on the above described information with the number of those read (step S37), so that a determination is made whether the comparison result indicates that the number of those original sheets is equal (step S38).

If the number of original sheets actually read is smaller than the number of original sheets stored in memory 9, a determination is made that the number of those original sheets is not identical in step S38. The reporting means 30 displays this result on CRT 13 as an error to report to the operator. If the number of original sheets is identical according to the result of comparison in step S38, registration is executed (step S39). In this registration, the secondary information read from OMR sheet 17 is added to the primary information read from the plurality of original sheets so as to be stored in storage device 6. When the registration of data sheets in one set is completed, a determination is made whether there are any further data sheets to be registered (step S40). If only one set is to be registered, it is determined that the next data sheets are absent in step S40 and registration processing is complete. If there are plural sets of data sheets to be registered, processing transfers to step S21. Based on secondary information provided in OMR sheet 17 of the next data sheets, the processing steps from S21 are serially executed, so that the registration is carried out.

As described above, since the number of original sheets previously set in OMR sheet 17 is compared with the number of original sheets actually read, and the result of comparison is reported to the operator when the number of original sheets compared is not identical, the operator can recognize whether or not a predetermined number of original sheets are read correctly.

While CRT 13 displays the result of comparison that the number of original sheets set in OMR sheet 17 is not identical to the number of those read in this embodiment, the result indicating nonidentical number of original sheets may be outputted as a reporting sound by employing output means such as a speaker.

The third embodiment.

Figure 7:
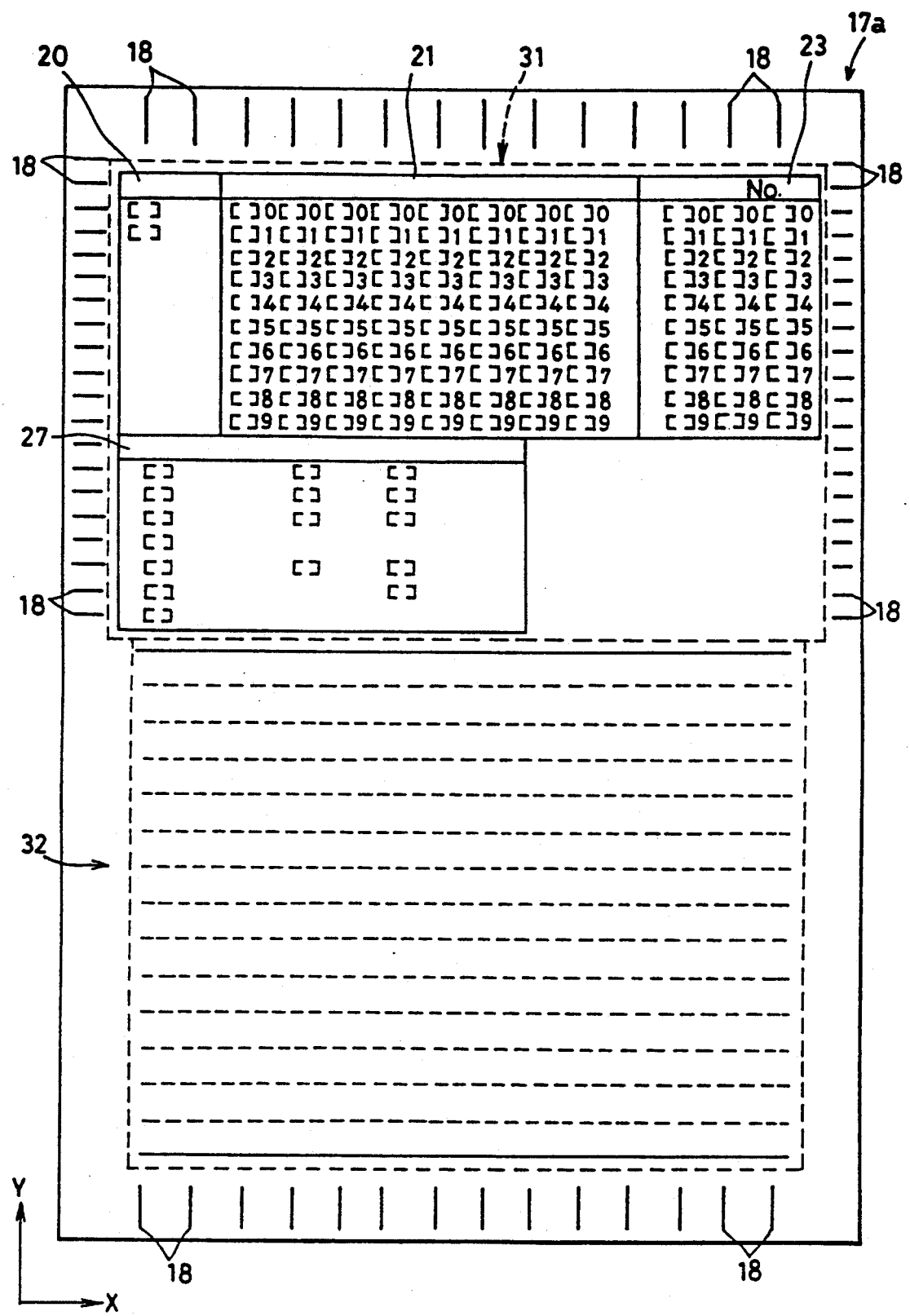
FIG. 7 is a diagram showing an OMR sheet applied to the third embodiment of the present invention.

An OMR sheet shown in FIG. 7 is employed in this embodiment.

Referring to FIG. 7, an OMR sheet 17a employed in this embodiment comprises in an upper half area thereof a secondary information portion 31 in which secondary information is written as marks, and comprises in a lower half area thereof a primary information portion 32 in which primary information to be such as characters and figures is written.

Timing marks 18 are provided for indicating reading areas in the top margin and in the right and left margins at the periphery of secondary information portion 31. These timing marks 18 are provided with a predetermined space from one another corresponding to the location of marks to be written in secondary information portion 31. Further, timing marks 18 are provided similarly in the bottom margin of primary information portion 32. No timing marks 18 are provided in the right and left margins of primary information portion 32.

The upper part of secondary information portion 31 includes a processing type selecting field 20 for selecting the type of processing, a registration date field 21 for indicating a registration date, and a data sheet number field 23 for indicating the registration number of data sheets to be registered. The lower part of secondary information portion 31 includes a key word field 27 for designating input/output devices of different types and indicating other information.

Marks are written in predetermined places in each of fields 20-23 and 27 in secondary information portion 31 in correspondence with the type of data sheets. Processing, such as registration and search of data sheets are performed based on information obtained from these marks.

The location of the marks can be recognized by detecting the location of timing marks 18 arranged in a row direction (X direction) and a column direction (Y direction) employing known art.

Primary information portion 32, includes a field in which different types of information may be registered such as receipts, business reports and business diaries can be directly written in the field.

As shown in FIG. 8, CPU 1 comprises determining means 14 and recognizing means 33.

Determining means 14 determines whether or not an OMR sheet read by scanner 5 is the above described OMR sheet 17a by detecting an area in which timing marks 18 are provided.

Recognizing means 33 recognizes marks written as secondary information in secondary information portion 31 formed on OMR sheet 17a separately from any characters, figures and the like written directly as primary information in primary information portion 32.

Since the electrical configuration of an electronic filing apparatus in this embodiment is the same as that shown in FIG. 1 in the first embodiment, a description thereof will not be repeated.

A description will now be given on a registration procedure in the electronic filing apparatus thus structured with reference to the flow chart of FIG. 9.

Prior to registration processing, secondary information is marked in each of fields 20-23 and 27 in secondary information portion 31 on OMR sheet 17a, and also primary information to be registered such as receipts, business reports and business diaries is written in advance in primary information portion 32.

First, an instruction including a registration processing is provided through a key operation of keyboard 2 (step S51). For data processing other than the registration processing in step S51, a transfer is made to the other processings. For of registration processing, the reading mode of scanner 5 is set employing, for example, keyboard 2 (step S52). When OMR sheet 17a is set in scanner 5, it is accepted by automatic paper feeding device 5a and read by scanner 5 (step S53).

Next, determining means 14 of CPU 1 determines whether OMR sheet 17a is an OMR sheet having primary information portion 32 (step S54). If a normal OMR sheet is read, a determination is made that the OMR sheet 17a does not have primary information portion 32 in step S54. After secondary information is recognized, primary information of the next original sheet is read and recognized so as to perform a normal registration processing.

Since OMR sheet 17a has primary information portion 32, recognizing means 33 recognizes in step S55 the secondary information of secondary information portion 31 on OMR sheet 17a separately from the primary information of the primary information portion 32. The secondary information recognized by recognizing means 33 is then temporarily stored in memory 9, while the primary information is compressed by companding circuit 8 (step S57) and is then temporarily stored in memory 9 (step S58).

Thereafter, when CPU 1 instructs an execution of registration, the primary information and secondary information stored temporarily in memory 9 are called (step S59). Further, the secondary information is added to the primary information to be registered in storage device 6 (step S60). The secondary information registered can be employed as a label in searching for primary information.

As described in the foregoing, since the primary and secondary information provided in OMR sheet 17a having secondary information portion 31 and primary information portion 32 can both be read and recognized, the registration processing of data sheets in which all information can be accommodated in one original sheet simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic filing apparatus comprising:
    a document scanner for optically scanning information contained on a single document sheet, where original image information is contained in a first designated area of the document sheet and control mark information is contained in a second designated area of the document sheet;
    means for receiving information scanned by the document scanner and determining whether the single sheet contains both the original image and control mark information;
    means for interpreting the control mark information into interpreted control information, wherein the control mark information designates key words relevant to subject matter of the original image information for searching the memory;
    means for compressing the original image information;
    registering means for correlating the compressed original image information with the interpreted control information;
    a memory for filing the correlated information;
    means for automatically feeding a plurality of document sheets to the document scanner;
    means for counting a number of document sheets fed by the means for automatically feeding;
    means for comparing a counted number of document sheets counted by the means for counting and an original number of document sheets indicated by the control mark information; and
    means for generating an alarm when the number of document sheets counted is not coincident with the original number of original document sheets.

2. An electronic filing apparatus according to claim 1, wherein the means for interpreting interprets control mark information to determine and set operating conditions of the document scanner.

3. An electronic filing apparatus according to claim 1, further comprising:
    means for decompressing compressed original image information filed in memory.

4. An electronic filing apparatus according to claim 1, wherein the second designated area includes plural fields for indicating various control information, at least one field including key words for use in searching documents filed in the memory, and
    said means for determining determines whether control information in each of the plural fields have been indicated by one or more control marks.

5. An electronic filing apparatus according to claim 1, wherein the original image information includes alphanumeric character and photographic images.

6. An electronic filing system comprising,
    a document scanner for optically scanning information contained on a set of documents, where a first document in the set contains control mark information and subsequent documents in the set contain original image information;
    means for receiving information scanned by the document scanner and translating the control mark information into translated control information, wherein the control mark information scanned from the first document includes a plurality of fields for containing control mark information, at least one of those fields containing control mark information corresponding to key words pertinent to the subject matter of the original image information contained on the subsequent documents in the set;

means for compressing the original image information;

registering means for correlating the compressed image information with the translated control information;

a memory for filing the correlated information;

a keyboard for permitting an operator to access original image information from the memory based on the key words;

means for automatically feeding documents to the document scanner;

means for counting counted number of documents fed by the means for automatically feeding, means for comparing the counted number of documents and an original number of original documents included in the control mark information; and means for generating an alarm when the counted number of documents is not coincident with the original number of documents.

7. The electronic filing system according to claim 6 wherein the means for translating translates control mark information to determine and set operating conditions of the document scanner.

8. The electronic filing system according to claim 6, further comprising means for decompressing compressed original image information filed in the memory.

9. The electronic filing system according to claim 6, wherein the memory is an optical disk.

* * * * *